United States Patent
Mou et al.

(10) Patent No.: US 10,496,110 B2
(45) Date of Patent: Dec. 3, 2019

(54) APPARATUS, SYSTEM AND METHOD OF MASS FLOW CONTROLLING FOR USE IN INTEGRATED GAS DELIVERY SYSTEM

(71) Applicant: Beijing Sevenstar Flow Co., Ltd, Beijing (CN)

(72) Inventors: Changhua Mou, Beijing (CN); Nelson Urdaneta, Beijing (CN); Yu Yang, Beijing (CN); Rui Wang, Beijing (CN)

(73) Assignee: BEIJING SEVENSTAR FLOW CO., LTD, Beijing (CN)

( * ) Notice: Subject to any disclaimer, the term of this patent is extended or adjusted under 35 U.S.C. 154(b) by 115 days.

(21) Appl. No.: 15/318,011

(22) PCT Filed: Jun. 25, 2014

(86) PCT No.: PCT/CN2014/080691
§ 371 (c)(1),
(2) Date: Dec. 12, 2016

(87) PCT Pub. No.: WO2015/188400
PCT Pub. Date: Dec. 17, 2015

(65) Prior Publication Data
US 2017/0115670 A1    Apr. 27, 2017

(30) Foreign Application Priority Data

Jun. 12, 2014 (CN) .......................... 2014 1 0260738

(51) Int. Cl.
*G05D 7/06* (2006.01)
(52) U.S. Cl.
CPC .................. *G05D 7/0635* (2013.01)

(58) Field of Classification Search
CPC .................................................... G05D 7/0635
USPC ......................................................... 700/109
See application file for complete search history.

(56) References Cited

U.S. PATENT DOCUMENTS

| | | | | |
|---|---|---|---|---|
| 9,256,228 B2 * | 2/2016 | Smirnov | ............. | G05D 7/0635 |
| 2011/0068961 A1 * | 3/2011 | Hashimoto | ......... | H03M 1/0602 |
| | | | | 341/118 |
| 2011/0106319 A1 * | 5/2011 | Takahashi | ............. | G05B 11/06 |
| | | | | 700/282 |

(Continued)

FOREIGN PATENT DOCUMENTS

| CN | 102961986 A | 3/2013 |
|---|---|---|
| CN | 103328936 A | 9/2013 |

*Primary Examiner* — Robert E Fennema
*Assistant Examiner* — Jigneshkumar C Patel
(74) *Attorney, Agent, or Firm* — Tianchen LLC; Yi Fan Yin; Yuan R. Li (57) ABSTRACT

An apparatus of mass flow controlling for use in an integrated gas delivery system, comprising an input terminal, an output terminal, a sensor unit, a flow rate control valve, and a control unit. The control unit comprises an A/D converter, a microprocessor, and a valve control circuit. The A/D converter converts an actual setting signal inputted by the input terminal into a first digital signal, and converts a flow rate detection signal outputted by the sensor unit into a second digital signal. The microprocessor further comprises a storage module, a setting signal calibration module and a calculation module. The valve control circuit generates, based on a control signal, an openness control signal, so as to control the flow rate control valve. It is concluded that the flow rate control quality is improved by the present invention.

8 Claims, 5 Drawing Sheets

(56) References Cited

U.S. PATENT DOCUMENTS

| | | | |
|---|---|---|---|
| 2011/0307104 A1* | 12/2011 | Smirnov | G05D 7/0635 700/282 |
| 2012/0186655 A1* | 7/2012 | Smirnov | G05D 7/0635 137/1 |

* cited by examiner

APPARATUS, SYSTEM AND METHOD OF MASS FLOW CONTROLLING FOR USE IN INTEGRATED GAS DELIVERY SYSTEM

CROSS-REFERENCE TO RELATED APPLICATION

This application claims the priority benefit of International Patent Application Serial No. PCT/CN2014/080691, filed Jun. 25, 2014, which is related to and claims the priority benefit of China patent application serial No. 201410260738.1, filed Jun. 12, 2014. The entirety of each of the above-mentioned patent applications is hereby incorporated by reference herein and made a part of this specification.

FIELD OF THE INVENTION

The present invention relates to the field of semiconductor manufacturing technology, and particularly to a mass flow control apparatus, system and method which can be used in an integrated gas delivery system.

BACKGROUND OF THE INVENTION

Figure 1:
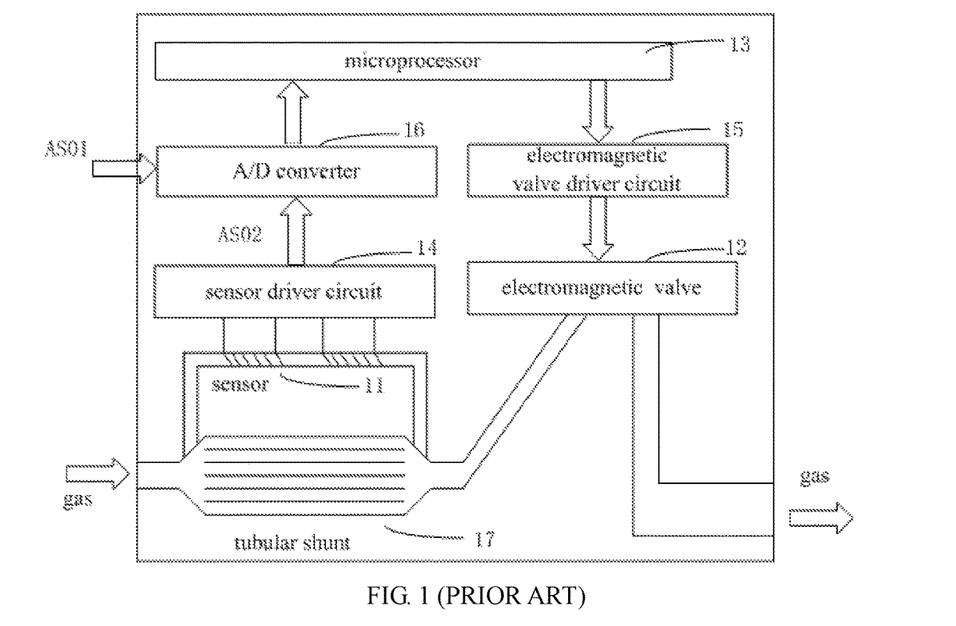
FIG. 1 is a block diagram of a prior art MFC.
Figure 2:
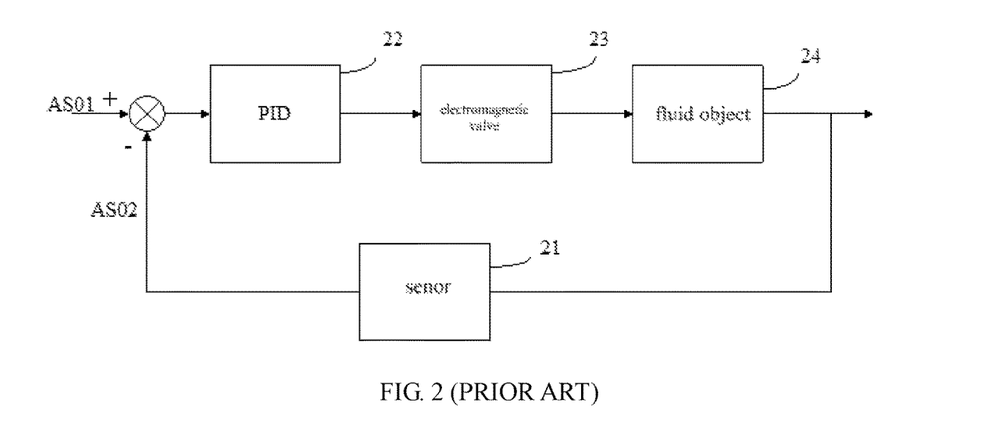
FIG. 2 is a circuit diagram of a closed-loop circuit according to the prior art MFC.

Measuring and controlling of a flow are crucial contents for an integrated gas delivery system. One commonly used device is a mass flow controller (MFC), which controls the introduced gas or liquid tightly. Referring to the FIG. 1, a block diagram of a prior art MFC is shown. The prior art MFC comprises a sensor 11, an electromagnetic valve 12, a sensor driver circuit 14 coupled to the sensor 11 in order to receive a detection signal from that, an electromagnetic valve driver circuit 15 coupled to the electromagnetic valve 12 in order to adjust a flow rate through that, a microprocessor 13 coupled to the sensor driver circuit 14 and the electromagnetic valve driver circuit 15 respectively, and an A/D converter 16. Various parameters of the gas or the liquid introduced into a tubular shunt 17, such as a flow rate, a flow, etc., are sensed by the sensor 11 and converted into an electronic signal to be outputted to the sensor driver circuit 14 for processing. The A/D converter 16 converts an inputted setting signal AS01 into a first digital signal, and converts the processed signal AS02 outputted by the sensor driver circuit 14 into a second digital signal. The microprocessor 13 is coupled to the A/D converter 16 for receiving the first digital signal and the second digital signal to generate a flow rate control signal. Then, the electromagnetic valve driver circuit 15 converts the flow rate control signal outputted by the microprocessor 13 into an analog signal to control the electromagnetic valve 12, so as to control the flow rate of the gas or the liquid. Referring to the FIG. 2, which is a circuit diagram of a closed-loop circuit according to the prior art MFC. In general, the mechanism of the prior art MFC is a control system having a closed-loop circuit. A difference in a detection signal AS02 outputted by a sensor 21 and a setting signal AS01 is calculated by a PID module 22 and converted into a control voltage to control an openness of an electromagnetic valve 23, so as to control a flow rate of a fluid 24 tightly.

Figure 3:
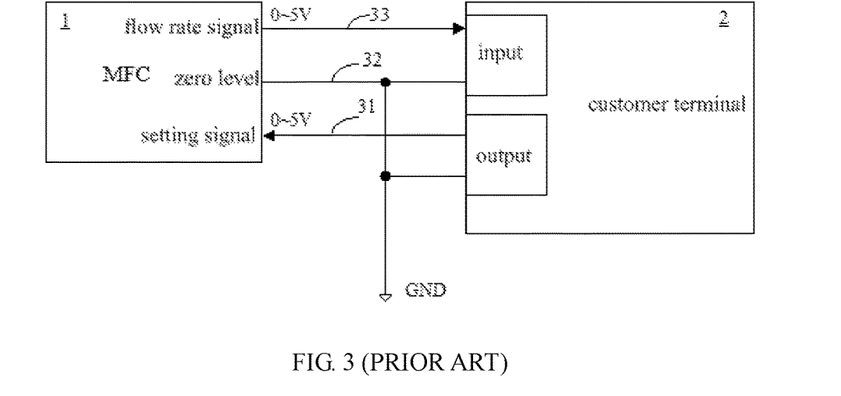
FIG. 3 is a schematic diagram of a using environment according to the prior art MFC.

In most cases, the analog voltage 0-5V is used to input and output signals according to the prior art MFC. That is to say that, the flow rate setting signal and the flow rate output signal are represented by a voltage value ranged from 0 to 5V. Referring to the FIG. 3, which is the using environment diagram of the prior art MFC. As shown in the FIG. 3, the MFC 1 is connected with a customer terminal 2 by three signal wires which includes a setting signal wire 31, a ground wire 32 and a flow rate signal wire 33. However, the signal will be lost during the transmission in the above-mentioned three signal wires due to the inappropriate arrangement of the ground wire, so as to the inaccuracy of the setting signal and the detection signal. For example, a setting voltage of 5V corresponding to a 100% full scale is provided from the customer terminal. Due to some errors from the ground wire and the system of the MFC, the received setting voltage by the MFC is only 4.95V. Therefore, an error of 0.05V is caused by the using environment, which leads to the inaccuracy of the MFC controlling. Similarly, if a flow rate signal of 5V is outputted from the MFC, the received voltage by the customer terminal is only 4.95V due to some errors from the ground wire and the system of the MFC. Therefore, the same error is caused again.

Accordingly, it is an urgent problem to be solved that how to reduce the error caused by the using environment to improve the accuracy of the MFC controlling and using.

BRIEF SUMMARY OF THE DISCLOSURE

To overcome the problems as mentioned above, it is an object of the present invention to provide a mass flow control apparatus and a control method of applying the mass flow control apparatus.

To achieve above object, a mass flow control apparatus is provided by the present invention, which comprises an input terminal, an output terminal, a sensor unit, a flow rate control valve and a control unit, wherein, the control unit is used to generate an openness control signal according to an actual setting signal received by the input terminal and a flow rate detection signal outputted by the sensor unit, and output the generated openness control signal to the flow rate control valve. The control unit comprises an A/D converter, a microprocessor and a valve control circuit. Wherein, the A/D converter is used to convert the actual setting signal into a first digital signal and convert the flow rate detection signal into a second digital signal. The microprocessor coupled to the A/D converter comprises a storage module, a setting signal calibration module and a calculation module, wherein, the storage module is used to store a correcting parameter characterized an intrinsic error value of the target setting signal and the actual setting signal, the setting signal calibration module is used to correct the first digital signal according to the correcting parameter, and the calculation module is used to generate a control signal by proceeding a calculation for a difference in the corrected first digital signal and the corrected second digital signal. The valve control circuit is coupled to the microprocessor for generating the openness control signal according to the control signal, so as to control the flow rate control valve.

Preferably, the microprocessor further comprises an error value reading module, which is coupled to the A/D converter and the storage module for reading the first digital signal outputted by the A/D converter according to a trigger signal when the target setting signal is zero, and storing it as the correcting parameter to the storage module.

Preferably, the control unit also includes a flow rate signal calibration module comprised in the microprocessor and coupled to the A/D converter and the storage module for correcting the second digital signal according to the correcting parameter, and a signal processing unit coupled to the microprocessor for converting the corrected second digital signal into a flow rate output signal and outputting the flow rate output signal to the outside of the mass flow control apparatus by the output terminal.

Preferably, the first digital signal is corrected by the setting signal calibration module through adding the correcting parameter.

Preferably, the second digital signal is corrected by the flow rate signal calibration module through adding the correcting parameter.

Preferably, the trigger signal is generated by a key action or a knob action.

The present invention also provides a mass flow control system, including the above-mentioned mass flow control apparatus and a customer terminal. The customer terminal comprises a target signal output terminal connected to the input terminal of the mass flow control apparatus through a first signal transmission wire for outputting the target setting signal, and a ground terminal connected to the ground terminal of the mass flow control apparatus through a ground wire.

Preferably, the microprocessor of the mass flow control apparatus also includes an error value reading module, which is coupled to the A/D converter and the storage module for reading the first digital signal outputted by the A/D converter according to a trigger signal when the target setting signal is zero, and storing it as the correcting parameter to the storage module.

Preferably, the control unit of the mass flow control apparatus also includes a flow rate signal calibration module comprised in the microprocessor and coupled to the A/D converter and the storage module for correcting the second digital signal according to the correcting parameter, and a signal processing unit coupled to the microprocessor for converting the corrected second digital signal into a flow rate output signal and outputting the flow rate output signal to the outside of the mass flow control apparatus by the output terminal. The customer terminal also includes a flow rate input terminal connected to the output terminal of the mass flow control apparatus through a second signal transmission wire for receiving the flow rate output signal.

The present invention also provides a mass flow controlling method applied to a mass flow control apparatus, comprising the steps of:

S11, receiving an actual setting signal from the outside of the mass flow apparatus;

S12, sensing a flow rate of a fluid in a flow path and outputting a flow rate detection signal;

S13, converting the actual setting signal into a first digital signal, and converting the flow rate detection signal into a second digital signal;

S14, correcting the first digital signal according to the correcting parameter characterized an intrinsic error value of the target setting signal and the actual setting signal;

S15, generating a control signal by a calculation for a difference in the corrected first digital signal and the corrected second digital signal;

S16, generating an openness control signal according to the control signal and acting the generated openness control signal to the flow rate control valve to control the flow rate of the fluid.

Preferably, the correcting parameter can be obtained by follow steps:

S21, setting a target setting signal as zero;

S22, receiving an actual setting signal corresponded to the zero target setting signal and converting the received actual setting signal into a digital signal;

S23, reading the digital signal according to a trigger signal, and storing the digital signal as the correcting parameter Preferably, the mass flow controlling method also includes following step:

S31, correcting the second digital signal according to the correcting parameter;

S32, converting the corrected second digital signal into a flow rate output signal, and outputting the flow rate output signal to the outside.

Preferably, the first digital signal is corrected by adding the correcting parameter.

Preferably, the second digital signal is corrected by adding the correcting parameter.

Preferably, the trigger signal is generated by a key action or a knob action.

In conclusion, the present invention has made great technological progress by correcting the received actual setting signal by the mass flow control apparatus with a correcting parameter to keep in consistent with the target setting signal. The error caused by the inappropriate arrangement of the ground wire is corrected, so that the flow rate is controlled more accurately. Further, the flow rate signal outputted by the mass flow control apparatus is also corrected by the correcting parameter to keep in consistent with the received signal by the customer terminal, so that the accuracy of the flow rate is improved.

DETAILED DESCRIPTION OF THE EMBODIMENTS

The present invention will be described in further details hereinafter by referring to the accompanying drawings, so as to provide a better understanding of the present invention. However, various modifications and variations can be made by the ordinary skilled in the art without departing the spirit and scope of the present invention.

The First Embodiment

Figure 4:
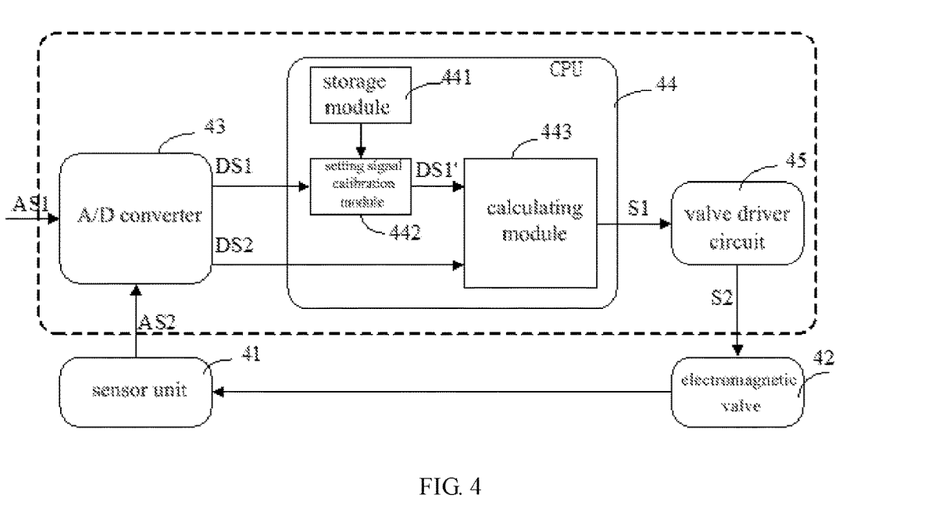
FIG. 4 is a block diagram illustrating a mass flow control apparatus according to the first embodiment of the present invention.

Referring to the FIG. 4, which is a block diagram illustrating a mass flow control apparatus according to the first embodiment of the present invention. The mass flow control apparatus comprises: an input terminal for receiving a flow rate setting signal inputted from the outside of the mass flow control apparatus, an output terminal for outputting the flow rate output signal to the outside of the mass flow control apparatus, a sensor unit 41 coupled to a fluid to sense its flow rate and output a flow rate detection signal AS2, a control unit used to generate an openness control signal according to an actual setting signal AS1 received by the input terminal and the flow rate detection signal AS2, and a flow rate control valve 42 (e.g., an electromagnetic valve 42) used to control the flow rate of the liquid according to the openness control signal outputted by the control unit 41. The control unit 41 comprises an A/D converter 43, a microprocessor 44 and a valve driver circuit 45. The A/D converter 43 coupled between the input terminal and a microprocessor 44 converts the flow rate setting signal AS1 received by the input terminal into a first digital signal DS1. In addition, the A/D converter 43 coupled to the sensor unit 41 converts the flow rate detection signal AS2 into a second digital signal DS2. A control signal S1 is generated by the microprocessor 44 basing on the first digital signal DS1 and the second digital signal DS2, and outputted to the valve control circuit 45. Then, the control signal S1 is converted into an analog openness control signal S2 by the valve control circuit 45 to be outputted to the electromagnetic valve 42 for controlling its openness. Finally, the flow rate of the fluid through the flow path is precisely controlled. The valve control circuit 45 also comprises a D/A converter or a filter used to convert a digital signal to an analog signal. Generally, the flow rate setting signal AS1 inputted by the input terminal and the flow rate detection signal AS2 outputted by the sensor unit 41 are a voltage in a certain wide range (e.g., 0-5V), respectively, characterizing the setting flow rate and the detection flow rate relative to a full-scale range, respectively.

In the practical application process, a flow rate setting signal is received from an outside customer terminal by the input terminal of the mass flow control apparatus. Specifically, the output terminal of the customer terminal is coupled to the input terminal of the mass flow control apparatus for sending out the flow rate setting signal, and the ground terminal of the customer terminal is coupled to the ground terminal of the mass flow control apparatus by a ground wire. However, there also exists an intrinsic error between the flow rate setting signal received by the input terminal of the mass flow control apparatus, i.e. the actual setting signal AS1, and the flow rate setting signal outputted by the customer terminal, i.e. the target setting signal, due to the intrinsic error caused by the ground wire or the system of the mass flow control apparatus. So, the control precision of the mass flow control apparatus will decline. In order to improve above-mentioned defect, a calibration function for the above-mentioned intrinsic error is provided by the microprocessor 44 of the present invention. Shown in the FIG. 4, the microprocessor 44 comprises a storage module 441, a setting signal calibration module 442, and a calculation module 443. Wherein, the storage module 441, such as EEPROM, is used to store a correcting parameter, which characterizes the intrinsic error between the target setting signal and the actual setting signal. The intrinsic error will not change with the change of the target setting signal. The setting signal calibration module 442 is used to generate a corrected first digital signal DS1' by correcting the first digital signal DS1 based on the correcting parameter. The calculation module 443 is used to generate a control signal S1 by proceeding a calculation for a difference of the second digital signal DS2 and the corrected first digital signal DS1'.

Specifically, a PID algorithm is adapted to generate the control signal S1. Since the corrected first digital signal DS1' is equivalent to the target setting signal directly converted by the A/D converter, the control signal S1 and the openness control signal S2 based on the corrected first digital signal DS1' and the second digital signal DS2 are more accurate.

Figure 5:
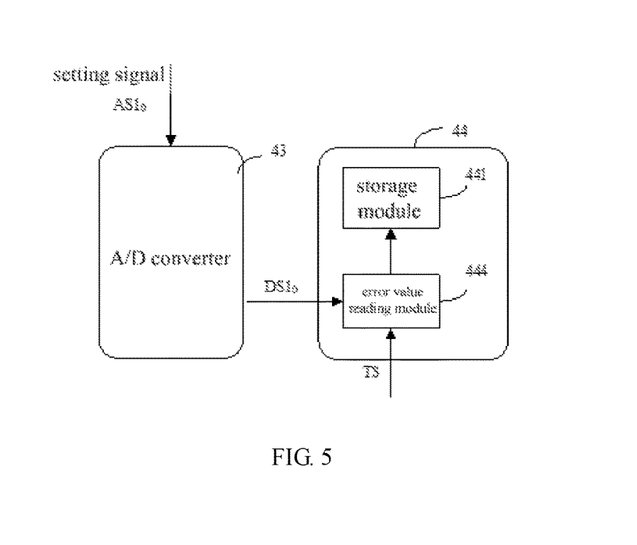
FIG. 5 is a block diagram illustrating a microprocessor of a mass flow control apparatus according to the first embodiment of the present invention.

In order to obtain the correcting parameter precisely, the microprocessor 44 of the present embodiment also includes an error value reading module 444 coupled to the A/D converter 43 and the storage module 411 and acted by a trigger signal TS, shown in the FIG. 5. Specifically, when the target setting signal is zero, the A/D converter 43 converts the actual setting signal $AS1_0$ received by the mass flow control apparatus into a first digital signal $DS1_0$. If the trigger signal TS is triggered now, the first digital signal $DS1_0$ will be read by the error value reading module 444 and stored in the storage module 441 as the correcting parameter V, which is a constant. Therefore, when the target setting signal is zero and the trigger signal TS is triggered at the same time, the error value reading module 444 reads and stores the correcting parameter. Wherein, the trigger signal may be generated by a key action or a knob action, or even by a click action or a gesture motion. For example, the customer terminal may provide some buttons (or keys/knobs). The user firstly set the outputted target setting signal by the customer terminal as 0V, then press the button, so the trigger signal TS is triggered and transmitted to the error value reading module of the mass flow control apparatus by wire or wireless means. At the same time, the error value reading module is triggered to read the correcting parameter. In addition, a pushbutton as a part of the mass flow control apparatus may also be provided, which is electrically coupled to the error value reading module. Or, an external remote control may be provided to send a trigger signal to the error value reading module. After the correcting parameter V is obtained, the microprocessor 44 automatically corrects the actual setting signal received by the input terminal when another target setting signal is outputted by the customer terminal.

The correction method of the present embodiment will be further described hereinafter. Firstly, assuming a target setting signal outputted by the customer terminal is attenuated by 0.05 V during the transmission to the mass flow control apparatus. That is the intrinsic error between the target setting signal $AS1_{Target}$ and the actual setting signal AS1 is 0.05V, i.e., $AS1_{Target}-AS1=0.05V$. A correcting parameter is used to correct the intrinsic error of 0.05V, and obtained by the error value reading module. In order to obtain the correcting parameter, firstly, the output target setting signal of the customer terminal is set as 0V, so the actual setting signal $AS1_0$ should be equal to −0.05V. Then, press the button, and the trigger signal is trigged. At this time, the error value reading module 444 reads the first digital signal $DS1_0$ valued by V outputted by the A/D converter, wherein, the V is a constant. So, the constant V is the correcting parameter. When the target setting signal outputted by the customer terminal is set as another value, for example, $AS1_{Target5}=5V$, the actual setting signal $AS1_5$ should be 4.95V. The flow rate detection signal AS2 outputted from the sensor unit 41 and the actual setting signal $AS1_5$ is converted into digital signals DS2 and $DS1_5$ by the A/D converter 43, respectively. Then, the digital signal $DS1_5$ is automatically corrected by the setting signal calibration module 442 by using a formula $DS1'_5=DS1_5+V$. Therefore, the corrected digital signal $DS1'_5$ is the sum of the digital signal $DS1_5$ and the correcting parameter V, which is like a digital signal directly converted by the A/D converter. Finally, the control signal S1 is generated by using a PID control based on the digital signal $DS1'_5$ and the digital signal DS2 via the calculation module 443, and outputted to the valve control circuit.

Further, the present invention also provides a mass flow control system composed of the above mass flow control apparatus and the customer terminal. The customer terminal further comprises a target signal output terminal coupled to the input terminal of the mass flow control apparatus through a first signal transmission wire for outputting the target setting signal and a ground terminal coupled to the ground terminal of the mass flow control apparatus through a ground wire.

In summary, the problem of low valve control accuracy due to the intrinsic error between the external target setting signal and the actual setting signal received by the mass flow control apparatus in the prior art has been solved by correcting the actual setting signal. The present embodiment can effectively improve the accuracy of flow control.

The Second Embodiment

A mass flow control apparatus according to the second embodiment of the present invention will be described below with reference to FIGS. 6-7.

Figure 7:
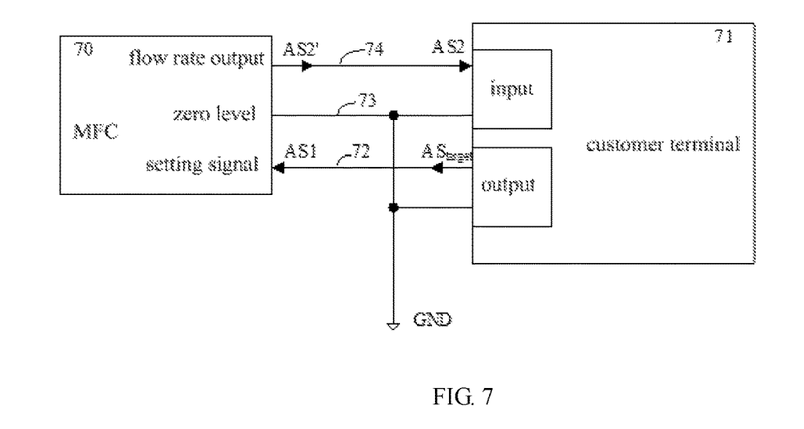
FIG. 7 is a schematic diagram illustrating a using environment of a mass flow control apparatus according to one embodiment of the present invention.

Referring to the FIG. 7, the mass flow control apparatus is connected to the customer terminal by some signal wires, including a setting signal wire, a ground wire and a flow rate signal wire. In this way, not only the customer terminal can send a target setting signal $AS_{Target}$ to the mass flow control apparatus, but also the mass flow control apparatus can send a flow rate output signal to the customer terminal. And messages of signals can be optionally displayed on a display module of the customer terminal. Due to the ground wire is also required during the transmission of the flow rate signal, the flow rate detection signal received from the mass flow control apparatus will be also lost during the transmission to the customer terminal. Like the intrinsic errors caused by the ground wire during the transmission of the setting signal to the mass flow control apparatus, the flow rate detection signal of the mass flow control device is also corrected in the present embodiment, based on the correcting parameter of the first embodiment, to help eliminate the error of the flow rate signal as much as possible.

Referring to the FIG. 7, again, which is a schematic diagram showing the using environment of the mass flow controller MFC according to the present embodiment. Shown in the FIG. 7, the mass flow control system comprises a MFC 70 and a customer terminal 71, wherein, the customer terminal 71 not only sends a target setting signal to the MFC 70, but also receives a flow rate output signal from the MFC 70. The target signal output terminal of the customer terminal 71 is coupled to the input terminal of the MFC 70 through a first signal transmission wire 72. The flow rate signal input terminal of the customer terminal 71 is coupled to a flow rate output terminal of the MFC 70 through a second signal transmission wire 74. The input terminal and the output terminal of the customer terminal 71 all comprise a ground terminal (not shown in the FIG. 7), which is coupled to a zero-level ground terminal of the MFC 70 through a ground wire. Therefore, the flow rate output signal sent by the MFC 70 will also be lost during the transmission to the customer terminal due to the intrinsic error of the ground wire. So, the following flow rate control will be impacted due to the inaccuracy of the actual flow rate value. It should be noticed that the intrinsic error is the same. Therefore, in the present embodiment, the flow rate output signal of the mass flow control apparatus is also corrected based on the correcting parameter, so that the flow rate signal received by the customer terminal coincides with the actual flow rate detection signal.

Figure 6:
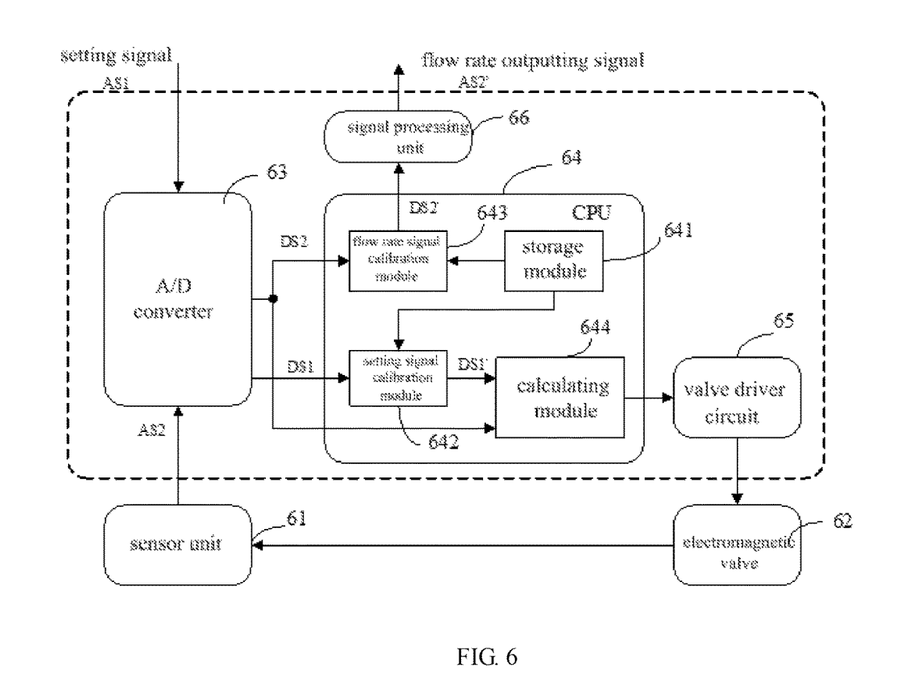
FIG. 6 is a block diagram illustrating a mass flow control apparatus according to the second embodiment of the present invention.

Specifically, referring to the FIG. 6, a mass flow control apparatus comprises: an input terminal for receiving an external flow rate setting signal, i.e., an actual setting signal, a output terminal for sending a flow rate output signal to the outside of the mass flow control apparatus, a sensor unit 61 for sensing a flow rate of a fluid through the flow path and outputting a flow rate detection signal AS2, a flow rate control valve 62 (an electromagnetic valve 62 according to the second embodiment) and a control unit. The control unit further includes an A/D converter 63, a microprocessor 64, a valve control circuit 65, and a processing circuit 66. The A/D converter 63 converts an actual setting signal AS1 into a first digital signal DS1 and converts a flow rate detection signal AS2 into a second digital signal DS2, respectively. A control signal S1 is generated by the microprocessor 64 according to the first digital signal DS1 and the second digital signal DS2, and is sent to the valve control circuit 65. The analog openness control signal S2 is generated by the valve control circuit 65 based on the control signal S1, and is sent to the electromagnetic valve 62 for regulating an openness of electromagnetic valve 62. Finally, the flow rate of the fluid flowing through the flow path is adjusted. A D/A converter or a filter circuit may be included in the valve control circuit 65 to convert the digital signal into an analog signal.

The microprocessor 64 coupled between the A/D converter 63 and the valve control circuit 65 comprises a storage unit 641, a setting signal calibration module 642, a flow rate signal calibration module 643 and a calculation module 644. Wherein, the storage module 641 stores a correcting parameter characterizing an intrinsic error value between the target setting signal and the actual setting signal. The intrinsic error value does not change with the change of the target setting signal. The first digital signal DS1 is corrected by the setting signal calibration module 642 basing on the correcting parameter. A control signal S1 is generated by the calculation module 664 by a PID operation basing on the difference of the corrected first digital signal DS1' and the second digital signal DS2. On the other hand, due to the ground wire is commonly used by the transmission of the flow rate signal and the setting signal between the mass flow control apparatus and the customer terminal, the error value generated during the transmission is intrinsically and the same. That is to say that the correcting parameter can be also used to calibrate the flow rate signal. Specifically, the second digital signal DS2 is corrected by the flow rate signal calibration module 643 according to the correcting parameter, and translated into the corrected second digital signal DS2'.

The signal processing unit 66 coupled to the microprocessor 64 converts the corrected second digital signal DS2' into a flow rate output signal outputted to the outside (such as a customer terminal) through an output terminal. Although, the corrected second digital signal DS2' is lost during the transmission, the flow rate signal received by the customer terminal coincides with the flow rate signal detected by the sensor unit 61. Therefore, the current flow rate can be obtained accurately, so as to control the fluid more accurately.

In the embodiment, the microprocessor also includes an error value reading module (not shown in the FIG. 6). When the target setting signal is 0 and the trigger signal TS is triggered, the correcting parameter is read by the error value reading module from the first digital signal converted by the A/D converter 63. The specific acquisition method of the correcting parameter and the function of the error value reading module are the same as those of the above-described embodiment, and will not be described in detail herein.

In the embodiment, the same correcting parameter is used to correct both the setting signal and the flow rate signal. Since the modification of the setting signal is like that of the first embodiment, the description will be omitted. The method for correcting the flow rate signal will be described in detail below.

Assuming that the target setting signal outputted from the customer terminal is attenuated by 0.05 V during the transmission to the mass flow control apparatus, so the flow rate signal detected by the mass flow control apparatus is also attenuated by 0.05 V during the transmission to the customer terminal, wherein, the intrinsic error is 0.05 V. The correcting parameter V is a digital value characterizing the intrinsic error value of 0.05 V, which acquisition method is the same as that of the above embodiment, and will not be described in detail.

Firstly, assuming a flow rate detection signal AS2 detected by the sensor unit 61 is 5V, marked by $AS2_5$, the flow rate detection signal $AS2_5$ is converted into a second digital signal $DS2_5$ via the A/D converter 63. Secondly, the second digital signal $DS2_5$ is automatically corrected by the flow rate signal calibration module 643 by using a formula $DS2'_5 = DS2_5 + V$. The corrected second digital signal $DS2'_5$ is the sum of the digital signal $DS2_5$ and the correcting parameter V. Thirdly, the corrected second digital signal $DS2'_5$ is converted into an analogy flow rate output signal $AS2'_5$ by the signal process unit. Due to the correcting parameter V corresponds to the analogy voltage 0.05V, the flow rate output signal converted by the signal process unit is $AS2'_5 = AS2_5 + 0.05\ V = 5.05\ V$. Finally, the flow rate output signal $AS2'_5$ is transmitted to the customer terminal. Due to the loss of 0.05 V during the transmission, a flow rate signal AS2 received by the customer terminal is exactly equal to 5V, which is equal to the value detected by the sensor unit 61.

Compared with the first embodiment, the present embodiment further corrects the flow rate detection signal of the mass flow control apparatus. Therefore, the problem of inaccuracy of the MFC controlling caused by the intrinsic error between the flow rate detection signal output value and the actual reception value of the customer terminal in the prior art is solved.

The Third Embodiment

Figure 8:
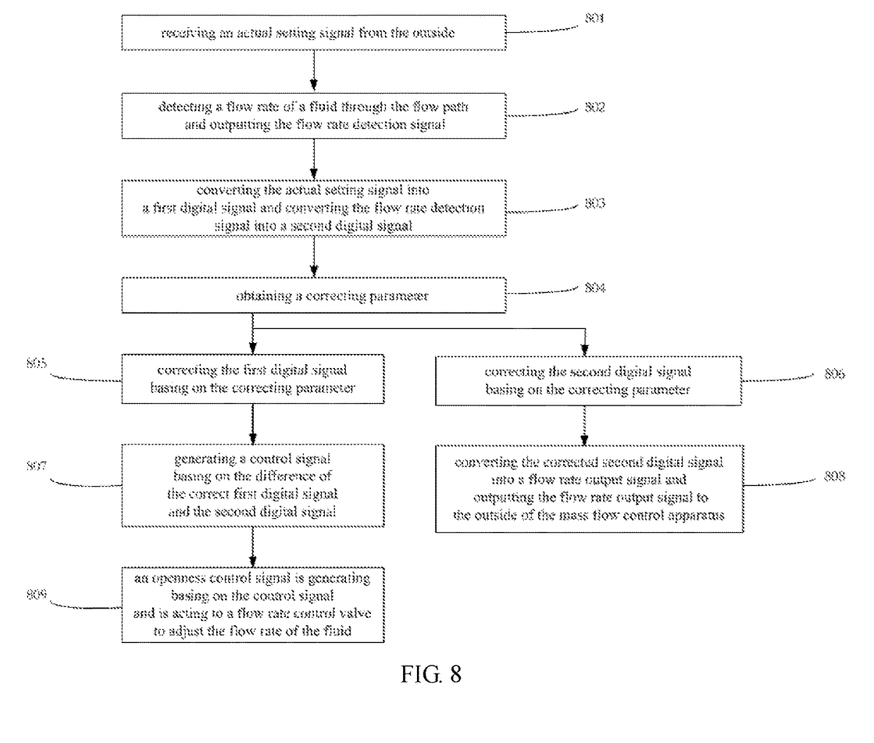
FIG. 8 is a flow sheet illustrating a mass flow controlling method according to one embodiment of the present invention.

A mass flow control method applied to a mass flow control apparatus according to the third embodiment of the present invention will now be described with reference to FIGS. 8-9.

The following steps are performed by a mass flow control apparatus:

S801: receiving an actual setting signal from external.

In this step, the input terminal of the mass flow control apparatus receives an actual setting signal AS1 from the external (such as a customer terminal). There is an intrinsic error between the actual setting signal AS1 and a target setting signal $AS_{Target}$ (the signal outputted from a customer terminal), i.e., the intrinsic error = $AS_{Target} - AS1$.

S802: detecting a flow rate of a fluid through the flow path and outputting the flow rate detection signal.

In this step, the sensor unit detects a flow rate of a fluid through the flow path and outputting the flow rate detection signal AS2.

S803: converting the actual setting signal into a first digital signal and converting the flow rate detection signal into a second digital signal.

In this step, an A/D converter of a control unit converts the actual setting signal AS1 into a first digital signal DS1 and converts the flow rate detection signal AS2 into a second digital signal DS2.

S804: obtaining a correcting parameter.

Figure 9:
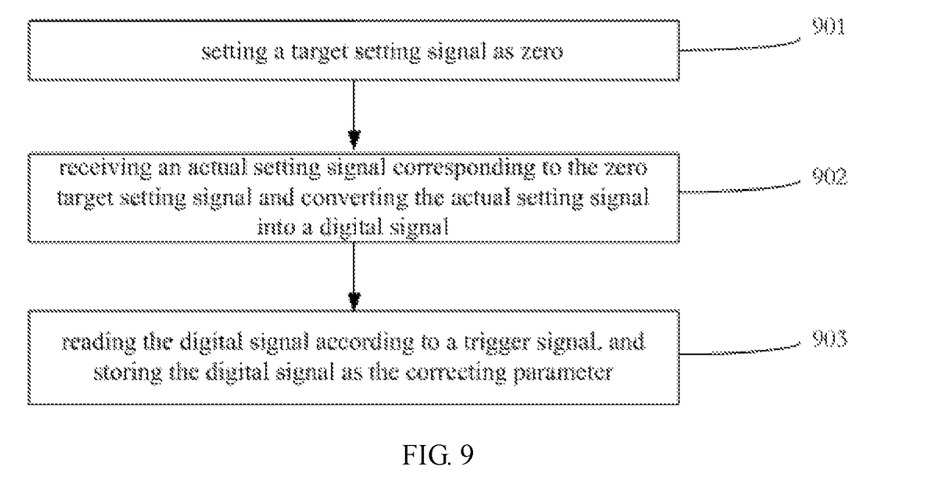
FIG. 9 is a flow sheet illustrating a correcting parameter generating method according to one embodiment of the present invention.

Referring to the FIG. 9, the correcting parameter will be obtained by following steps of: S901, setting a target setting signal as zero. Specifically, the user sends out an order of the target setting signal $AS_{Target0}$ valued by zero via the customer terminal, which will be outputted to the MFC. S902, receiving an actual setting signal corresponded to the zero target setting signal and converting the received actual setting signal into a digital signal. Specifically, an actual setting signal $AS1_0$ is received by the input terminal of the mass flow control apparatus, and converted into the first digital signal $DS1_0$ via the A/D converter. S903, a trigger signal TS is triggered by the users (such as push a button), then the error value reading module of the mass flow control apparatus reads the first digital signal $DS1_0$ and store it as the correcting parameter V.

S805: correcting the first digital signal basing on the correcting parameter V.

In this step, the first digital signal DS1 is corrected by the setting signal calibration module basing on the correcting parameter V, and translated into the corrected first digital signal DS1'. Herein, the correcting parameter V is a constant to characterize an intrinsic error value of the target setting signal $AS_{Target}$ and the actual setting signal AS1. The first digital signal DS1 and the corrected first digital signal DS1' satisfy a formula $DS1' = DS1 + V$.

S807: generating a control signal basing on the difference of the correct first digital signal and the second digital signal.

In this step, the calculation module generates a control signal basing on the difference of the corrected first digital signal DS1' and the second digital signal DS2 by using a PID method.

S809: generating an openness control signal based on the control signal, and acting the generated openness control signal to the flow rate control valve to adjust the flow rate of the fluid.

In this step, the valve control circuit receives the control signal outputted from the calculation module, and converts the received control signal into an analogy openness control signal to control the openness of the mechanical valve. The valve control circuit may include a D/A converter or a filter to apply a digital-analog conversion.

On the other side, the control method of the present invention can also correct the flow rate signal after getting the correcting parameter in the S804. The correction of the flow rate signal is shown as follows:

S806: correcting the second digital signal basing on the correcting parameter V. In this step, the second digital signal DS2 is corrected by the flow rate signal calibration module basing on the correcting parameter V, and translated into the corrected second digital signal DS2'. The second digital signal DS2 and the corrected second digital signal DS2' satisfy a formula $DS2' = DS2 + V$.

S808: converting the corrected digital signal into a flow rate output signal and outputting the flow rate output signal to the outside of the mass flow control apparatus.

In this step, the signal process unit converts the corrected digital signal DS2' into an analogy flow rate output signal and outputs the analogy flow rate output signal to the outside of the mass flow control apparatus (such as a customer terminal).

In the all above embodiments, the functions of the various parts of the control unit may be implemented by the form of hardware, software, firmware, or a combination thereof. For example, hardware circuitry (such as a valve control circuit), stored in the microprocessor, may be adapted to accomplish some functions of the control unit by utilizing a computer program, which is provided in such a manner that it can be recorded on a computer-readable recording medium such as a floppy disk, a CD-ROM, or a DVD. A host computer reads the computer program from the recording medium and transfers it to an internal storage unit, which will be executed by the microprocessor when the function of the computer program is realized. Of course, the host computer may directly execute the computer program stored in the recording medium. In addition, the computer-readable recording medium of the present invention is not limited to a portable recording medium such as a floppy disk, a CD-ROM, or a DVD, but also various internal storage devices such as a RAM, a ROM, or an external storage device such as a hard disk.

In summary, the present invention has made great technological progress by correcting the received actual setting signal by the mass flow control apparatus with a correcting parameter to keep in consistent with the target setting signal. The error caused by the inappropriate arrangement of the ground wire is corrected, so that the flow rate is controlled more accurately. Further, the flow rate signal outputted by the mass flow control apparatus is also corrected by the correcting parameter to keep in consistent with the received signal by the customer terminal, so that the accuracy of the flow rate is improved.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A mass flow controlling method applied to a mass flow control apparatus, comprising the steps of:
    S11, receiving an actual setting signal from the outside of the mass flow control apparatus;
    S12, sensing a flow rate of a fluid and outputting a flow rate detection signal;
    S13, converting the actual setting signal into a first digital signal, and converting the flow rate detection signal into a second digital signal;
    S14, correcting the first digital signal according to a correcting parameter characterized an intrinsic error value of a target setting signal and the actual setting signal, wherein the target setting signal is outputted from a customer terminal to the mass flow control apparatus through a ground wire, wherein the intrinsic error value represents intrinsic errors caused by the ground wire during the transmission of the target setting signal to the mass flow control apparatus;
    S15, generating a control signal by a calculation for a difference in the corrected first digital signal and the second digital signal;
    S16, generating an openness control signal according to the control signal and acting the generated openness control signal to a flow rate control valve to control the flow rate of the fluid.

2. The method according to claim 1, wherein the correcting parameter can be obtained by follow steps:
    S21, setting the target setting signal as zero;
    S22, receiving an actual setting signal corresponded to the zero target setting signal and converting the received actual setting signal into a digital signal;
    S23, reading the digital signal according to a trigger signal, and storing the digital signal as the correcting parameter.

3. The method according to claim 2, wherein the trigger signal is generated by a key action or a knob action.

4. The method according to claim 2, wherein the mass flow controlling method also includes following steps:
    S31, correcting the second digital signal according to the correcting parameter;
    S32, converting the corrected second digital signal into a flow rate output signal, and outputting the flow rate output signal to the outside.

5. The method according to claim 1, wherein the mass flow controlling method also includes following steps:
    S31, correcting the second digital signal according to the correcting parameter;
    S32, converting the corrected second digital signal into a flow rate output signal, and outputting the flow rate output signal to the outside.

6. The method according to claim 5, wherein the second digital signal is corrected by adding the correcting parameter.

7. The method according to claim 5, wherein the flow rate output signal is outputted to the customer terminal.

8. The method according to claim 1, wherein the first digital signal is corrected by adding the correcting parameter.

* * * * *